(12) United States Patent
Kubo (10) Patent No.: US 8,736,758 B2
(45) Date of Patent: May 27, 2014

(54) IMAGE SIGNAL PROCESSING METHOD AND APPARATUS

(71) Applicant: International Business Machines Corporation, Armonk, NY (US)

(72) Inventor: Hiroaki Kubo, Shiga-Ken (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/786,620

(22) Filed: Mar. 6, 2013

(65) Prior Publication Data

US 2014/0092303 A1    Apr. 3, 2014

(30) Foreign Application Priority Data

Mar. 6, 2012   (JP) .................................. 2012-049792

(51) Int. Cl.
     *H04N 11/20*      (2006.01)
     *H04N 9/64*      (2006.01)

(52) U.S. Cl.
     USPC ......................................... 348/453; 348/708

(58) Field of Classification Search
     USPC ......... 348/708, 445, 441, 443, 444, 453, 458, 348/712, 713; 382/167
     See application file for complete search history.

(56) References Cited

U.S. PATENT DOCUMENTS

2010/0039560 A1*   2/2010   Han ................................ 348/575

FOREIGN PATENT DOCUMENTS

| JP | 11027696 | 1/1999 |
| JP | 2009239881 | 10/2009 |
| JP | 2010093672 | 4/2010 |

\* cited by examiner

*Primary Examiner* — Sherrie Hsia
(74) *Attorney, Agent, or Firm* — Ian D. MacKinnon; Keivan Razavi (57) ABSTRACT

The present invention enables an image signal processing that can improve color representation of an image signal converted from YCrCb 4:2:2 format to YCrCb 4:2:0 format. An image signal processing apparatus 500 includes a buffer 520 for retaining YCrCb 4:2:2 image signals captured by an image signal input 510, a frame and line recognizer 530 for determining whether the line from which the YCrCb 4:2:2 image signals are captured is a first line or a second line of an adjacent line pair based on frame and line information on the YCrCb 4:2:2 image signals captured by the image signal input 510, and a Cr and Cb data corrector 540 for, if the frame and line recognizer 530 determines that the line is the second line, reading YCrCb 4:2:2 image signals for the pixels in the first line at the same horizontal positions as the pixels in the second line from the buffer 520 and correcting Cr and Cb data on the YCrCb 4:2:2 image signals for the pixels at least in the first line of the first and second lines of the line pair based on Cr and Cb data on the captured YCrCb 4:2:2 image signals for the pixels in the second line.

12 Claims, 11 Drawing Sheets

IMAGE SIGNAL PROCESSING METHOD AND APPARATUS

CLAIM OF PRIORITY

The present application claims the benefit of priority of JP patent application 2012-049792, entitled "IMAGE SIGNAL PROCESSING METHOD AND APPARATUS", filed Mar. 6, 2012, with the Japanese Patent and Trademark Office, the content of which is incorporated herein by reference in its entirety.

The present application further claims the benefit of priority of PCT patent application JP2013/051088, entitled "IMAGE SIGNAL PROCESSING METHOD AND APPARATUS", filed Jan. 21, 2013, with the Japanese Patent and Trademark Office, the content of which is incorporated herein by reference in its entirety.

BACKGROUND

The present invention relates to an image signal processing. In particular, it relates to an image signal processing method and an image signal processing apparatus for processing color information of an image signal.

In image processing, which involves an enormous amount of data, image signals can be compressed for processing. For example, digital image signals can be represented by Y (luminance), Cr (chrominance (red-yellow)) and Cb (chrominance (blue-yellow)) according to three different formats: YCrCb 4:4:4, YCrCb 4:2:2 and YCrCb 4:2:0, which have less color information and higher compression rates in this order.

According to the YCrCb 4:4:4 format, every pixel has a Y value, which is luminance data, and a Cr value and a Cb value, which are chrominance data.

According to the YCrCb 4:2:2 format, each pair of adjacent pixels in the horizontal direction have individual Y values, which are luminance data, but share a Cr value and a Cb value, which are chrominance data.

According to the YCrCb 4:2:0 format, the YCrCb 4:2:2 format is expanded to pairs of adjacent lines in the vertical direction. That is, in a pair of adjacent lines, a pair of adjacent pixels in the horizontal direction has individual Y values, which are luminance data, and not only the pair of adjacent pixels in the horizontal direction but also a pair of pixels in the adjacent lines shares a Cr value and a Cb value, which are chrominance data. Typically, the Cr value and the Cb value, which are chrominance data on the pixels in the upper line, are applied to the pixels in the lower line of the adjacent line pair.

Conversion of a YCrCb 4:2:2 image signal into a YCrCb 4:2:0 image signal involves thinning out the color information and therefore makes it impossible to display an image of a thin line having a one-pixel width. For example, consider the case where one horizontal red line (having a one-pixel width) is drawn on a black screen, and the screen is converted from the YCrCb 4:2:2 format to the YCrCb 4:2:0 format. If the line representing the horizontal line is a line that retains the red color information without being thinned out, the retained red color information is encoded, so that no problem arises. However, if the line representing the horizontal line is a line that retains no red color information because of thinning out, the color information on the line above, which is black, not red, because the screen is black, is applied to the line. Consequently, the thin line loses the red color information and appears gray.

Figure 1:
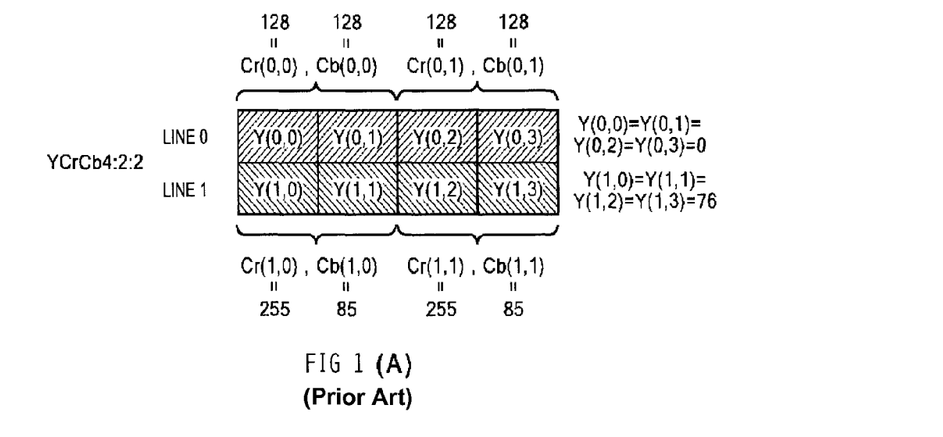
Figure 1B:
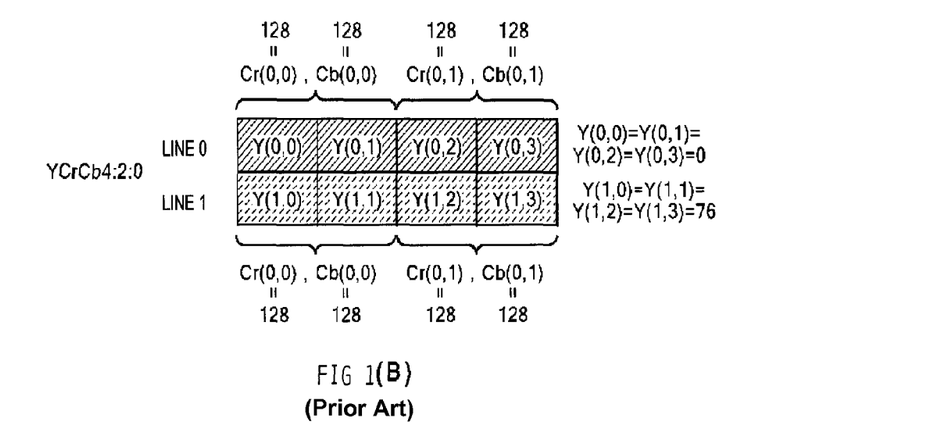

FIG. 1 shows YCrCb 4:2:2 image signals and YCrCb 4:2:2 image signals for illustrating how a thin line loses red color information. FIG. 1(A) shows YCrCb 4:2:2 image signals for pixels (0, 0) to (1, 3) in two adjacent lines 0 and 1 in the vertical direction. On the assumption that each of the Y value, which is luminance data, and the Cr value and the Cb value, which are chrominance data, is 8-bit data, and the lines 0 and 1 appear black and red, respectively, the pixels (0, 0) to (0, 3) have individual Y values (Y=0 in this example), which are luminance data, and each pair of adjacent pixels in the horizontal direction share a Cr value (Cr=128 in this example) and a Cb value (Cb=128 in this example), which are chrominance data. The pixels (1, 0) to (1, 3) have individual Y values (Y=76 in this example), which are luminance data, and each pair of adjacent pixels in the horizontal direction share a Cr value (Cr=255 in this example) and a Cb value (Cb=85 in this example), which are chrominance data.

FIG. 1(B) shows YCrCb 4:2:0 image signals for pixels (0, 0) to (1, 3) in the lines 0 and 1 resulting from the compression. The pixels (0, 0) to (0, 3) in the line 0 have the same Y value (Y=0), which is luminance data, and the same Cr value (Cr=128) and the same Cb value (Cb=128). However, the pixels (1, 0) to (1, 3) in the line 1 have different chrominance data, a Cr value of 128 and a Cb value of 128, which are the chrominance data of the pixels (0, 0) to (0, 3) in the line 0, although the Y value, which is luminance data, has not changed (Y=76). In this way, the pixels (1, 0) to (1, 3) in the line 1 loses the red color information and retain only the Y value (Y=76), which is luminance data, and therefore appears as a gray-scale line.

Figure 2:
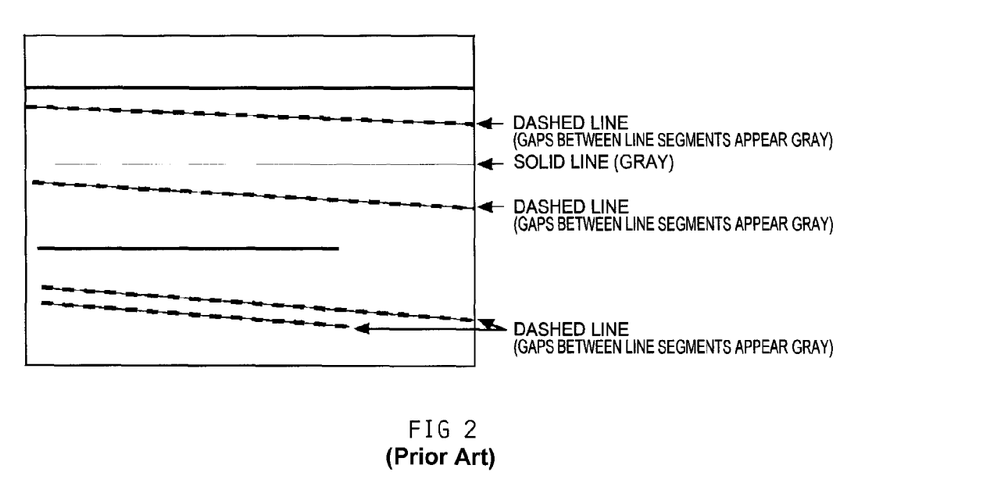
FIG. 2 is a schematic diagram showing an example of a display screen on which images of thin lines represented by conventional compressed YCrCb 4:2:0 image signals.

As shown in FIG. 2, according to prior art, such a thin line becomes a gray-scale line and thus less visible or, if the line is oblique, appears as a dashed line. Conventionally, it was a common practice to ignore the loss of color information in the course of the compression to the YCrCb 4:2:0 format and avoid rendering such a very thin line segment, and there is no substantial solution.

Patent Literature 1 discloses a signal converting circuit in a digital camera that performs a conversion from the YCrCb 4:2:2 format to the YCrCb 4:4:4 format.

Patent Literature 2 discloses an electronic device that accepts the YUV422 format and YUV420 format in a color space coding framework.

Patent Literature 3 discloses a technique of recording digital television signals in a recording medium by converting input YCrCb 4:2:2 component signals into YCrCb 4:2:0 component signals through a line sequential processing, in which two chrominance signals Cr and Cb, which have less visual effects, are thinned out at a rate of one line per field, and then performing a compression coding processing.

Patent Literature 4 discloses a video conversion apparatus that has an interlace/progressive converter that converts the video format of a video signal from the interlace format to the progressive format and a chrominance format converter that converts the chrominance format of a video signal from the 4:2:0 format to the 4:2:2 format. The video conversion apparatus can reduce deterioration of the quality of an image represented by a video signal by the interlace/progressive converter converting a received interlaced 4:2:0 video signal by performing interpolation of the luminance component and the chrominance components of the video signal and the chrominance format converter converting the video format before converting the chrominance format of the video signal.

SUMMARY

An object of the present invention is to enable an image signal processing that can improve color representation of an image signal converted from YCrCb 4:2:2 format to YCrCb 4:2:0 format. The object of the present invention includes providing an image signal processing method and an image signal processing apparatus that can improve color representation of such an image signal and provide a display of an image of a thin line having a one-pixel width.

An image signal processing method according to an implementation of the present invention retains a YCrCb 4:2:2 image signal in a buffer and processes the YCrCb 4:2:2 image signal. The image signal processing method comprises: a step of capturing YCrCb 4:2:2 image signals from a line in a frame on a pixel basis; a step of determining whether the line including the pixels from which the YCrCb 4:2:2 image signals are captured is a first line or a second line of an adjacent line pair; a step of, if it is determined that said line is the first line, retaining the YCrCb 4:2:2 image signals for the pixels in the first line in the buffer; a step of, if it is determined that said line is the second line, reading YCrCb 4:2:2 image signals for the pixels in the first line at the same horizontal positions as the pixels in the second line from the buffer and correcting Cr and Cb data on the YCrCb 4:2:2 image signals for the pixels at least in the first line of the first and second lines of the line pair based on Cr and Cb data on the captured YCrCb 4:2:2 image signals for the pixels in the second line; a step of sending the YCrCb 4:2:2 image signals with the corrected Cr and Cb data for the pixels in the first line as the YCrCb 4:2:2 image signals for the pixels in the first line; a step of retaining the YCrCb 4:2:2 image signals for the pixels in the second line in the buffer; a step of sending the YCrCb 4:2:2 image signals for the pixels in the second line retained in the buffer as the YCrCb 4:2:2 image signals for the pixels in the second line; and a step of repeating a process from the step of capturing the YCrCb 4:2:2 image signals from a line on a pixel basis to the step of sending the YCrCb 4:2:2 image signals for the pixels in the second line retained in the buffer until the line from which the YCrCb 4:2:2 image signals are captured reaches a final line in a final frame.

In one embodiment, the step of sending the YCrCb 4:2:2 image signals for the pixels in the second line retained in the buffer as the YCrCb 4:2:2 image signals for the pixels in the second line includes sending the YCrCb 4:2:2 image signals for the pixels in the second line retained in the buffer before the step of retaining the YCrCb 4:2:2 image signals for the pixels in the first line of a next adjacent line pair to be captured in the buffer.

In one embodiment, the step of correcting the Cr and Cb data on the YCrCb 4:2:2 image signals for the pixels at least in the first line of the first and second lines of the line pair includes correcting the Cr and Cb data on the YCrCb 4:2:2 image signals for the pixels in both the first line and the second line of the line pair.

In one embodiment, the correction of the Cr and Cb data on the YCrCb 4:2:2 image signals for the pixels in both the first line and the second line of the line pair includes averaging the Cr and Cb data on the YCrCb 4:2:2 image signals for the pixels in both the first line and the second line.

An image signal processing apparatus for processing a YCrCb 4:2:2 image signal according to an implementation of the present invention comprises: an image signal input for capturing YCrCb 4:2:2 image signals from a line in a frame on a pixel basis; a buffer for retaining the YCrCb 4:2:2 image signals captured by the image signal input; a frame and line recognizer for determining whether the line from which the YCrCb 4:2:2 image signals are captured is a first line or a second line of an adjacent line pair based on frame and line information on the YCrCb 4:2:2 image signals captured by the image signal input; a Cr and Cb data corrector for, if the frame and line recognizer determines that said line is the second line, reading YCrCb 4:2:2 image signals for the pixels in the first line at the same horizontal positions as the pixels in the second line from the buffer and correcting Cr and Cb data on the YCrCb 4:2:2 image signals for the pixels at least in the first line of the first and second lines of the line pair based on Cr and Cb data on the captured YCrCb 4:2:2 image signals for the pixels in the second line; and an image signal output for sending the YCrCb 4:2:2 image signals for a line in a frame on a pixel basis, wherein if the frame and line recognizer determines that said line is the first line, the captured YCrCb 4:2:2 image signals for the pixels in the first line are retained in the buffer, and if the frame and line recognizer determines that said line is the second line, the Cr and Cb data on the YCrCb 4:2:2 image signals for the pixels in the second line from the Cr and Cb data corrector are retained in the buffer, the YCrCb 4:2:2 image signals with the corrected Cr and Cb data for the pixels in the first line are sent as the YCrCb 4:2:2 image signals for the pixels in the first line, and the YCrCb 4:2:2 image signals for the pixels in the second line retained in the buffer are sent as the YCrCb 4:2:2 image signals for the pixels in the second line, and YCrCb 4:2:2 image signals are captured from a line on a pixel basis, the YCrCb 4:2:2 image signals with the corrected Cr and Cb data for the pixels in the first line are sent, and the YCrCb 4:2:2 image signals for the pixels in the second line retained in the buffer are sent until it is recognized from the frame and line information that the line from which the YCrCb 4:2:2 image signals are captured reaches a final line in a final frame.

In one embodiment, the sending of the YCrCb 4:2:2 image signals for the pixels in the second line retained in the buffer occurs before the YCrCb 4:2:2 image signals for the pixels in the first line of a next adjacent line pair to be captured are retained in the buffer.

In one embodiment, the Cr and Cb data corrector corrects the Cr and Cb data on the YCrCb 4:2:2 image signals for the pixels in both the first line and the second line of the line pair.

In one embodiment, the Cr and Cb data corrector averages the Cr and Cb data on the YCrCb 4:2:2 image signals for the pixels in both the first line and the second line.

The present invention enables an image signal processing that can improve color representation of an image signal converted from YCrCb 4:2:0 format from YCrCb 4:2:2 format. In particular, the present invention provides an image signal processing method and an image signal processing apparatus that can improve color representation of such an image signal and provide a display of an image of a thin line having a one-pixel width.

BRIEF DESCRIPTION OF THE DRAWINGS

FIGS. 1 (A) and 1 (B) are schematic diagrams showing examples of the data configuration of a conventional YCrCb 4:2:2 image signal FIG. 1 (A) and a compressed YCrCb 4:2:0 image signal FIG. 1 (B);

DETAILED DESCRIPTION

In the following, best modes for carrying out the present invention will be described in detail with reference to the drawings. However, the embodiments described below are not intended to limit the scope of the present invention defined by the claims, and all the combinations of the features described in the embodiments are not always essential for the solutions according to the present invention. The present invention can have many different implementations and should not be construed to be limited to the embodiments specifically described. Throughout the description of the embodiments, the same constituent parts or components are denoted by the same reference numerals.

Figure 3:
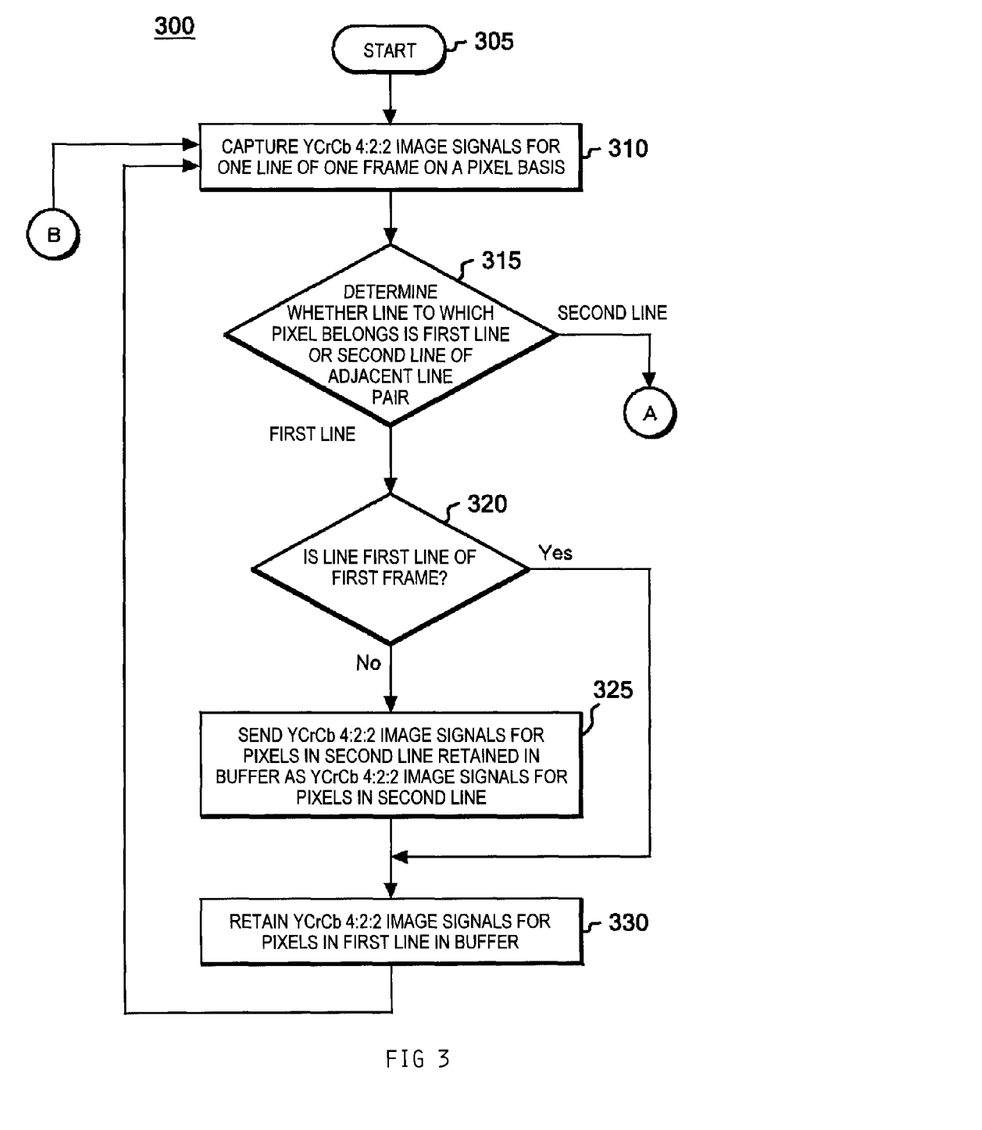
FIG. 3 is a schematic flowchart for illustrating an image signal processing method according to an embodiment of the present invention.

FIG. 3 is a schematic flowchart showing an image signal processing method according to an embodiment of the present invention. For example, the method starts with input of YCrCb 4:2:2 image signals for a screen or frame comprising 640 by 480 or 800 by 600 pixels, for example (Step 305). In Step 310, YCrCb 4:2:2 image signals for a line of a frame are captured on a pixel basis. For example, in the case where the frame comprises 640 by 480 pixels, a YCrCb 4:2:2 image signal is captured for each of the pixels 0, 1, 2, 3, ..., 639 in each of the lines 0, 1, 2, 3, ..., 479. The YCrCb 4:2:2 image signal can be an 8-bit signal that represents data on Y, Cr and Cb, for example, but is not limited to such an 8-bit configuration.

YCrCb 4:2:2 image signals for 640 pixels 0 to 639 in the line 0 of the first frame, for example, are first input and captured as the pixels in the line 0. Then, YCrCb 4:2:2 image signals for 640 pixels 0 to 639 in the line 1 of the first frame are input and captured as the pixels in the line 1. Such capturing is performed for all the lines of the frame, and once the YCrCb 4:2:2 image signals are captured for the 480 lines up to the line 479, for example, YCrCb 4:2:2 image signals for the next frame are sequentially input and captured in the same manner starting with the pixel 0 in the line 0 on a pixel basis. This operation is repeated until the last line of the last frame is reached. Thus, to which frame, to which line and to which pixel the YCrCb 4:2:2 image signal belongs are recognized and identified when the image signal is captured.

Figure 10:
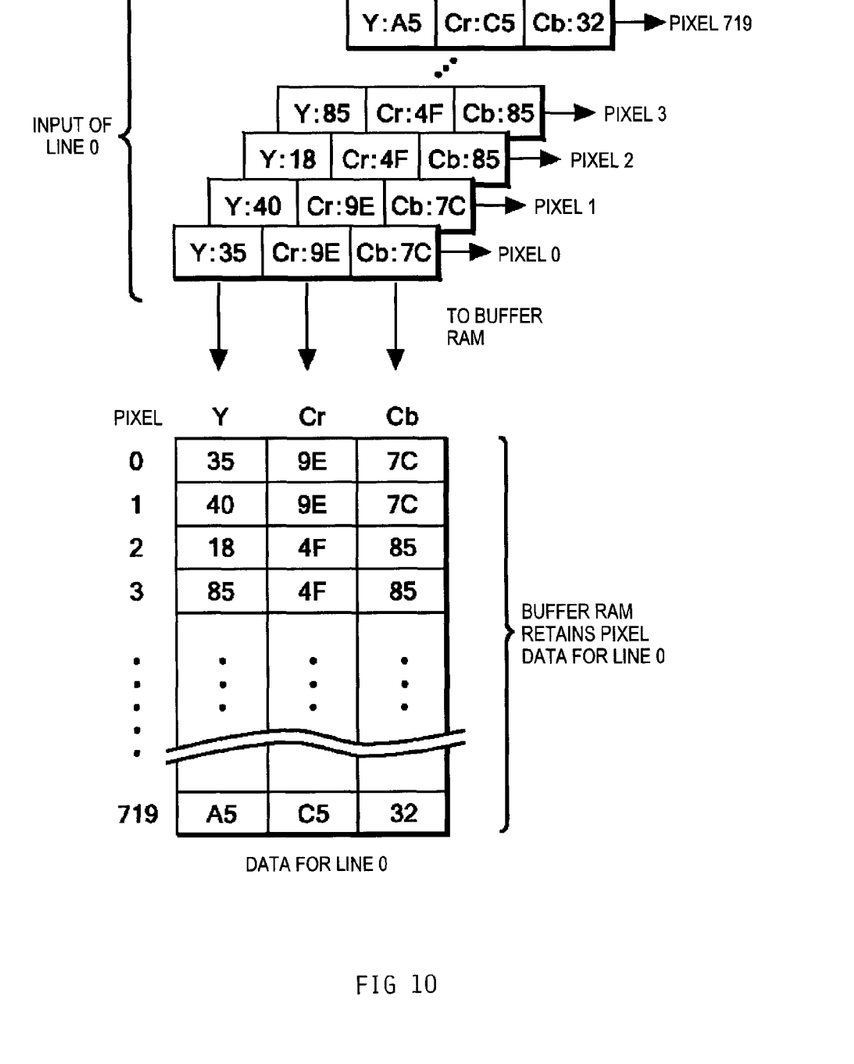
FIG. 10 is a diagram showing an example of the way in which YCrCb 4:2:2 image signals for pixels in a first line are retained in a buffer RAM.

FIG. 10 show an example of the way in which YCrCb 4:2:2 image signals for the pixels in the line 0, which is a first line of an adjacent line pair, are retained in a buffer RAM. The Y, Cr and Cb data on the YCrCb 4:2:2 image signal are composed of 8 bits and expressed in hexadecimal notation. One line is composed of 720 pixels 0 to 719. The YCrCb 4:2:2 image signals for the pixels are sequentially captured and retained in the buffer RAM.

Returning to FIG. 3, in the following Step 315, it is determined whether or not the line to which the captured pixels belong is the first line or the second line of the adjacent line pair. Since to which frame, to which line and to which pixel the YCrCb 4:2:2 image signal belongs are recognized and identified when the image signal is captured, the line to which the captured pixels belong is determined to be the first line of the line pair if the line is the line 0, which forms an adjacent line pair with the line 1, and determined to be the second line of the line pair if the line is the line 1.

If it is determined in Step 315 that the line to which the captured pixels belong is the first line of the adjacent line pair, the method proceeds to Step 320, in which it is determined whether or not the line to which the captured pixels belong is the first line of the first frame. The reason why it is determined in Step 320 whether or not the line to which the captured pixels belong is the first line of the first frame is that the pixels in the first line in the first frame are captured and retained in the buffer from the beginning thereof. Thus, if it is determined in Step 320 that the line to which the captured pixels belong is the first line of the first frame (if Yes in Step 320), the method proceeds to Step 330, in which the YCrCb 4:2:2 image signals for the pixels in the first line are retained in the buffer. Since the first line of the first frame is the first line of the adjacent line pair, the YCrCb 4:2:2 image signals are retained in the buffer as the pixels in the first line.

If it is determined in Step 320 that the line to which the captured pixels belong is not the first line of the first frame (if No in Step 320), the method proceeds to Step 325, in which the YCrCb 4:2:2 image signals for the pixels in the second line retained in the buffer are sent as the YCrCb 4:2:2 image signals for the pixels in the second line. Although it depends on the storage capacity of the buffer, provided that the storage capacity of the buffer is one line of YCrCb 4:2:2 image signals, the YCrCb 4:2:2 image signals for the pixels in the second line retained in the buffer are overwritten and lost when the YCrCb 4:2:2 image signals for the pixels in the first line in the next line pair are captured and retained in the buffer, because the Cr and Cb data on the YCrCb 4:2:2 image signals for the pixels in the second line are used to correct the Cr and Cb data on the YCrCb 4:2:2 image signals for the pixels in the first line and then retained in the buffer as described later with regard to the steps shown in FIG. 4 in the branch A followed in the case where it is determined in Step 315 that the line to which the captured pixels belong is the second line of the adjacent line pair. Thus, if the YCrCb 4:2:2 image signals for the pixels in the second line retained in the buffer are sent out before they are lost, the YCrCb 4:2:2 image signals for the pixels in the second line can be sent out immediately after the YCrCb 4:2:2 image signals for the pixels in the first line are sent out.

In the following Step 330, the YCrCb 4:2:2 image signals for the pixels in the first line are retained in the buffer as described later. Once the YCrCb 4:2:2 image signals for the pixels in the first line are retained in the buffer in Step 330, the method returns to Step 310, and the YCrCb 4:2:2 image signals for the pixels in the next line of the frame are captured on a pixel basis.

Figure 4:
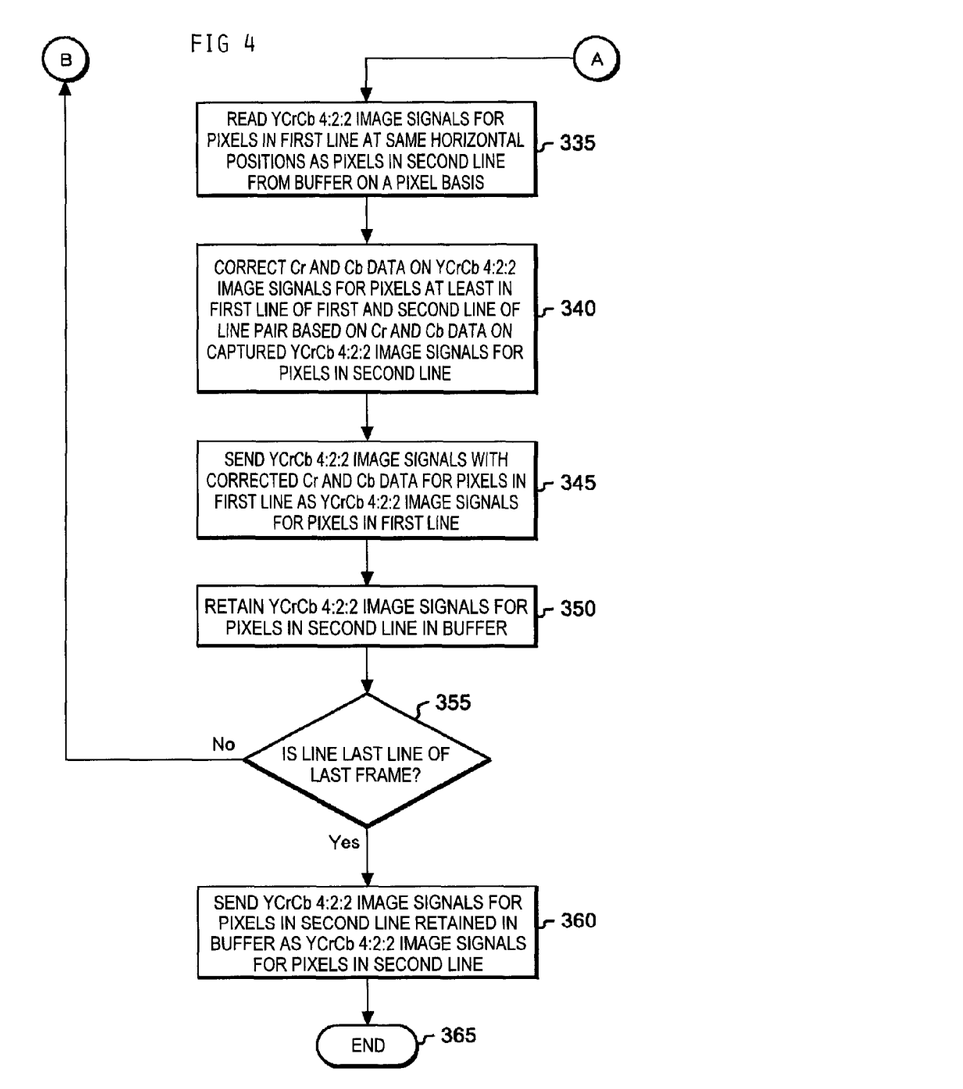
FIG. 4 is a schematic flowchart for illustrating a branch of the image signal processing method according to the embodiment of the present invention shown in FIG. 3.

If it is determined in Step 315 that the line to which the captured pixels belong is the second line of the adjacent line pair, the method proceeds to Step 335 shown in FIG. 4, following the branch A. In Step 335, YCrCb 4:2:2 image signals for the pixels in the first line that are located at the same horizontal positions or in other words denoted by the same pixel identification numbers as the pixels in the relevant second line are read from the buffer. The YCrCb 4:2:2 image signals for the pixels in the first line have already been retained in the buffer in Step 330 shown in FIG. 3.

Figure 11:
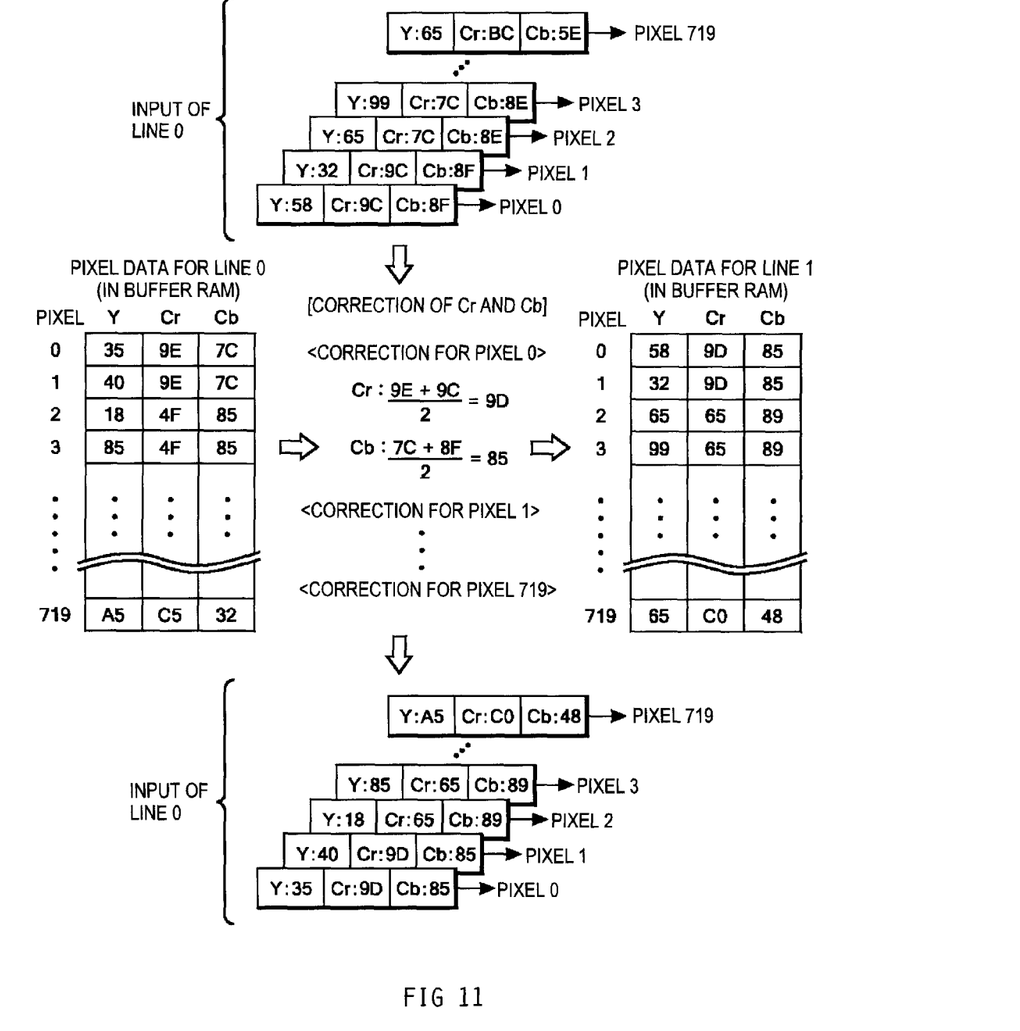
FIG. 11 is a diagram showing an example of the way in which Cr and Cb data on the YCrCb 4:2:2 image signals for pixels in the first line are corrected based on Cr and Cb data on YCrCb 4:2:2 image signals for pixels in a second line.

In the following Step 340, based on the Cr and Cb data on the captured YCrCb 4:2:2 image signals for the pixels in the second line, the Cr and Cb data on the YCrCb 4:2:2 image signals for the pixels at least in the first line of the first and second lines of the line pair are corrected. FIG. 11 shows an example of the way in which the Cr and Cb data on the YCrCb 4:2:2 image signals for the pixels in the line 0, which is the first line of the line pair, are corrected based on the Cr and Cb data on the YCrCb 4:2:2 image signals for the pixels in the line 1, which is the second line of the line pair. The YCrCb 4:2:2 image signals for the pixels in the line 0, which is the first line, that are retained in the buffer RAM are read for use. In the example shown in FIG. 11, the Cr and Cb data on the YCrCb 4:2:2 image signals for the pixels in the line 0, which is the first line, are corrected by taking the average of the Cr and Cb data on the YCrCb 4:2:2 image signal for each pixel in the line 0, which is the first line, and the Cr and Cb data on the YCrCb 4:2:2 image signal for the corresponding pixel in the line 1, which is the second line.

In the following Step 345, as the YCrCb 4:2:2 image signals for the pixels in the first line, the YCrCb 4:2:2 image signals for the pixels in the first line whose Cr and Cd data have been corrected are sent out. As shown in FIG. 11, the YCrCb 4:2:2 image signals for the pixels 0 to 719 in the line 0, which is the first line, whose Cr and Cb data have been corrected by averaging on a pixel basis are sent out.

In the following Step 350, the YCrCb 4:2:2 image signals for the pixels in the second line are retained in the buffer. Since the YCrCb 4:2:2 image signals for the pixels in the first line have already been sent out in the previous Step 345, no problem arises even if the YCrCb 4:2:2 image signals for the pixels in the second line are retained in the buffer and therefore the YCrCb 4:2:2 image signals for the pixels in the first line are lost at this point in time. FIG. 11 shows that the YCrCb 4:2:2 image signals for the pixels 0 to 719 in the line 1, which is the second line, whose Cr and Cb data have been corrected by averaging on a pixel basis are retained in the buffer RAM. However, since it is essential only that the Cr and Cb data on the YCrCb 4:2:2 image signals for the pixels at least in the first line are corrected, the input YCrCb 4:2:2 image signals for the pixels 0 to 719 in the line 1, which is the second line, may be retained in the buffer as they are without correcting the Cr and Cb data.

In the following Step 355, it is determined whether or not the line to which the captured pixels belong is the last line of the last frame. If it is determined that the line to which the captured pixels belong is the last line in the last frame (if Yes in Step 355), the method proceeds to Step 360. In Step 360, as the YCrCb 4:2:2 image signals for the second line, the YCrCb 4:2:2 image signals for the pixels in the second line retained in the buffer are sent out. Then, the method ends in Step 365. If it is determined that the line to which the captured pixels belong is not the last line of the last frame (if No in Step 355), the method returns to Step 310, following the branch B, and the process from Step 310 in which the YCrCb 4:2:2 image signals for a line of a frame are captured on a pixel basis to Step 355 in which it is determined whether or not the line to which the captured pixels belong is the last line of the last frame is repeated.

Figure 5:
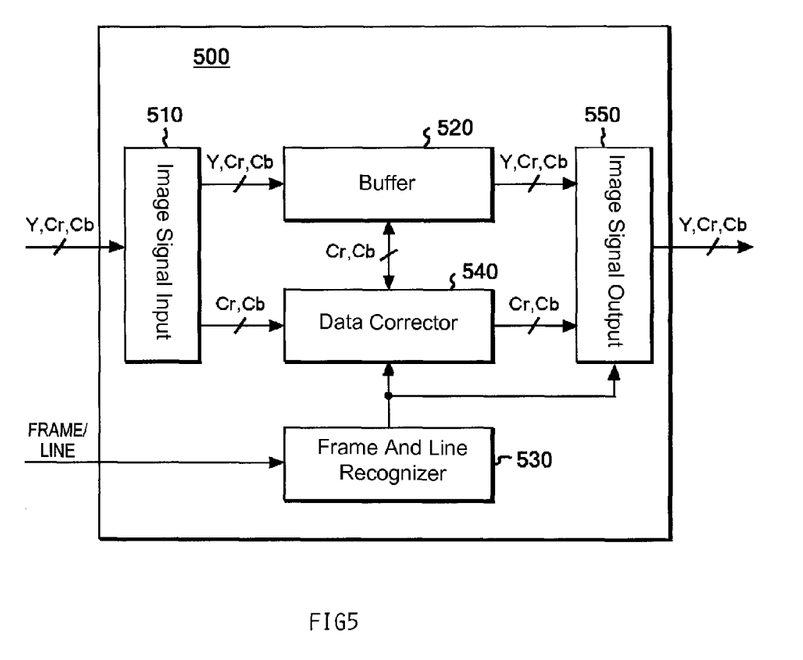
FIG. 5 is a schematic block diagram showing an image signal processing apparatus according to an embodiment of the present invention.

FIG. 5 schematically shows a configuration of an image signal processing apparatus according to an embodiment of the present invention. An image signal processing apparatus 500 comprises an image signal input 510, a buffer 520, a frame and line recognizer 530, a Cr and Cb data corrector 540 and an image signal output 550.

The image signal input 510 captures Y components, Cr components and Cb components (each of which is 8-bit data) of YCrCb 4:2:2 image signals for a line of a frame on a pixel basis, provides the Y, Cr and Cb components to the buffer 520 and provides the Cr and Cb components to the Cr and Cb data corrector 540.

The buffer 520 retains the Y, Cr and Cb components of the YCrCb 4:2:2 image signals provided from the image signal input 510 and provides the Y, Cr and Cb components to the image signal output 550. Furthermore, the buffer 520 provides the Cr and Cb components to the Cr and Cb data corrector 540 and retains Cr and Cb components provided from the Cr and Cb data corrector 540.

The frame and line recognizer 530 determines whether the line from which the Y, Cr and Cb components are captured is the first line or the second line of an adjacent line pair based on frame and line information (frame/line) on the Y, Cr and Cb components of the YCrCb 4:2:2 image signals captured by the image signal input 510, the frame and line information being captured separately from the Y, Cr and Cb components, and provides the result of the determination that the line is the first line or the second line (the result of determination as to which line of the line pair is relevant) to the Cr and Cb data corrector 540 and the image signal output 550.

If the frame and line recognizer 530 determines that the line is the second line, the Cr and Cb data corrector 540 reads the Cr and Cb components of the YCrCb 4:2:2 image signals for the pixels in the first line located at the same horizontal positions or in other words denoted by the same pixel identification numbers as the pixels in the second line from the buffer 520 on a pixel basis, corrects the data on the Cr and Cb components of the YCrCb 4:2:2 image signals for the pixels at least in the first line of the first line and the second line of the line pair based on the data on the Cr and Cb components of the captured YCrCb 4:2:2 image signals for the pixels in the second line, and provides the corrected Cr and Cb data to the buffer 520 and the image signal output 550.

The image signal output 550 receives the Y, Cr and Cb components retained in the buffer 520 or the Cr and Cb data corrected by the Cr and Cb data corrector 540 and sends out the Y, Cr and Cb components of the processed YCrCb 4:2:2 image signals for a line in a frame on a pixel basis.

With the image signal processing apparatus 500, if the frame and line recognizer 530 determines that the line is the first line, the Y, Cr and Cb components of the YCrCb 4:2:2 image signals for the pixels in the first line captured by the image signal input 510 are retained in the buffer 520. If the frame and line recognizer 530 determines that the line is the second line, the data on the Cr and Cb components of the YCrCb 4:2:2 image signals for the pixels in the second line from the Cr and Cb data corrector 540 are retained in the buffer.

As the YCrCb 4:2:2 image signals for the pixels in the first line, the image signal processing apparatus 500 sends out the Y, Cr and Cb components of the YCrCb 4:2:2 image signals for the pixels in the first line the data on the Cr and Cb components of which are corrected by the Cr and Cb data corrector 540. As the YCrCb 4:2:2 image signals for the pixels in the second line, the image signal processing apparatus 500 sends out the Y, Cr and Cb components of the YCrCb 4:2:2 image signals for the pixels in the second line retained in the buffer 520.

The image signal processing apparatus 500 captures the Y, Cr and Cb components of the YCrCb 4:2:2 image signals for a line on a pixel basis, sends out the YCrCb 4:2:2 image signals for the pixels in the first line the data on the Cr and Cb components of which are corrected by the Cr and Cb data corrector 540 and sends out the YCrCb 4:2:2 image signals for the pixels in the second line retained in the buffer 520 until it is recognized from the frame and line information (frame/line) captured by the frame and line recognizer 530 that the line being captured is the last line of the last frame.

The image signal processing apparatus 500 can sent out the Y, Cr and Cb components of the YCrCb 4:2:2 image signals for the pixels in the second line retained in the buffer 520 before the YCrCb 4:2:2 image signals for the pixels in the first line of the adjacent line pair to be captured next are retained in the buffer 520. Although it depends on the storage capacity of the buffer, provided that the storage capacity of the buffer 520 is one line of YCrCb 4:2:2 image signals, the Y, Cr and Cb components of the YCrCb 4:2:2 image signals for the pixels in the second line retained in the buffer 520 are overwritten and lost when the Y, Cr and Cb components of the YCrCb 4:2:2 image signals for the pixels in the first line in the next line pair are captured and retained in the buffer 520, because the Y, Cr and Cb components of the captured YCrCb 4:2:2 image signals for the pixels in the second line are used to correct the data on the Cr and Cb components of the YCrCb 4:2:2 image signals for the pixels in the first line and then retained in the buffer 520. Thus, if the Y, Cr and Cb components of the YCrCb 4:2:2 image signals for the pixels in the second line retained in the buffer 520 are sent out before they are lost, the Y, Cr and Cb components of the YCrCb 4:2:2 image signals for the pixels in the second line can be sent out immediately after the Y, Cr and Cb components of the YCrCb 4:2:2 image signals for the pixels in the first line are sent out.

Figure 6:
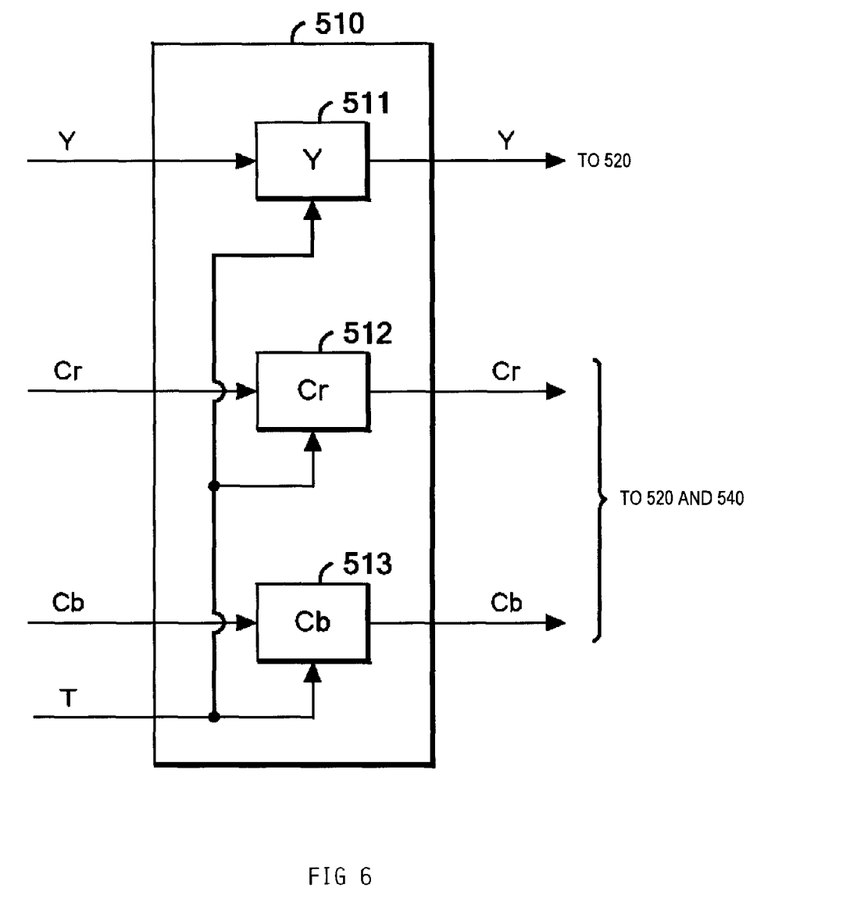
FIG. 6 is a diagram showing an example of the configuration of an image signal input of the image signal processing apparatus.

FIG. 6 shows an example of the configuration of the image signal input 510. The image signal input 510 includes latch-like circuits (Y) 511, (Cr) 512 and (Cb) 513 that temporarily store the Y, Cr and Cb components of the YCrCb 4:2:2 image signals for the pixels, respectively. The circuit (Y) 511, the circuit (Cr) 512 and the circuit (Cb) 513 are synchronized with each other by a timing signal T and capture the Y, Cr and Cb components of the YCrCb 4:2:2 image signal for each pixel, respectively. The circuit (Y) 511 provides a component image signal Y to the buffer 520. The circuit (Cr) 512 provides a component image signal Cr to the buffer 520 and the Cr and Cb data corrector 540, and the circuit (Cb) 513 provides a component image signal Cb to the buffer 520 and the Cr and Cb data corrector 540.

Figure 7:
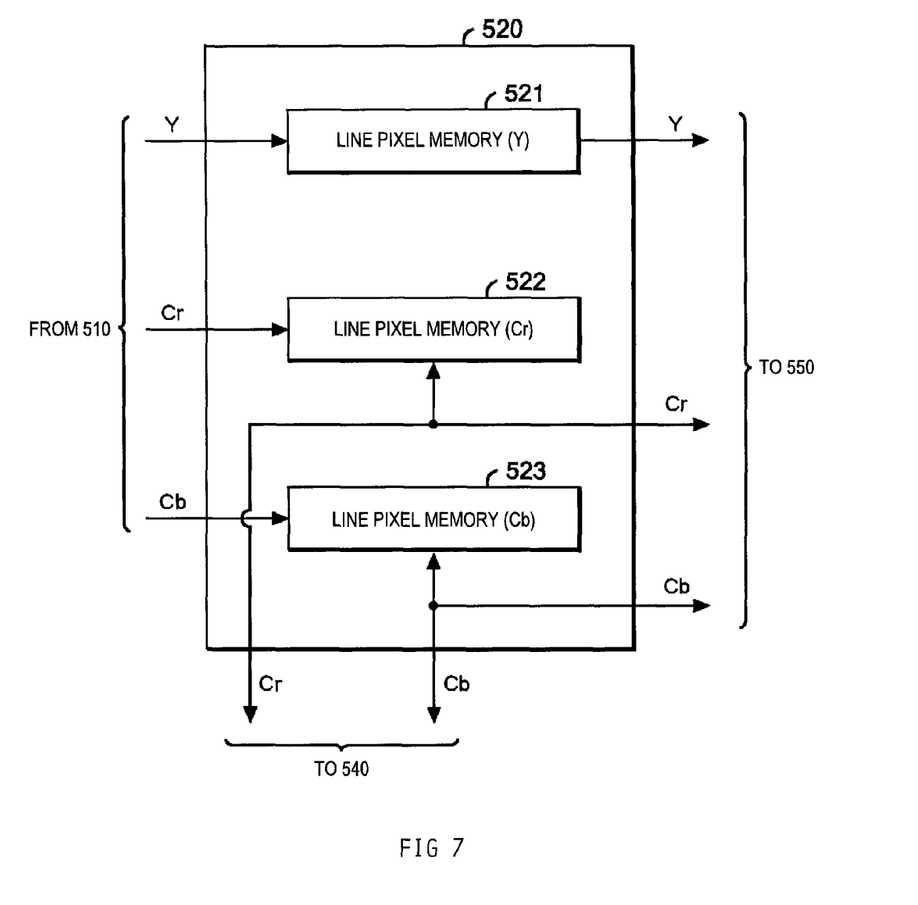
FIG. 7 is a diagram showing an example of the configuration of a buffer of the image signal processing apparatus.

FIG. 7 shows an example of the configuration of the buffer 520. The buffer 520 includes a line pixel memory (Y) 521, a line pixel memory (Cr) 522 and a line pixel memory (Cb) 523, such as RAMs, that retain one line of component image signals Y, Cr and Cb, respectively. The line pixel memory (Y) 521, the line pixel memory (Cr) 522 and the line pixel memory (Cb) 523 acquire and retain the component image signals Y, Cr and Cb provided from the circuit (Y) 511, the circuit (Cr) 512 and the circuit (Cb) 513 of the image signal input 510, respectively. For the pixels in the first line of the adjacent line pair, the retained component image signals Cr and Cb are read from the line pixel memory (Cr) 522 and the line pixel memory (Cb) 523 into the Cr and Cb data corrector 540. For the pixels in the second line of the adjacent line pair, the component image signals Cr and Cb are provided from the Cr and Cb data corrector 540 to the line pixel memory (Cr) 522 and the line pixel memory (Cb) 523, respectively, and retained therein. The line pixel memory (Y) 521, the line pixel memory (Cr) 522 and the line pixel memory (Cb) 523 provide their respective retained component image signals Y, Cr and Cb to the image signal output 550. Although the line pixel memory (Y) 521, the line pixel memory (Cr) 522 and the line pixel memory (Cb) 523 have been described as having a storage capacity of one line of image signals, the memories may have a storage capacity of multiple lines of image signals. However, in that case, the hardware cost increases accordingly.

Figure 8:
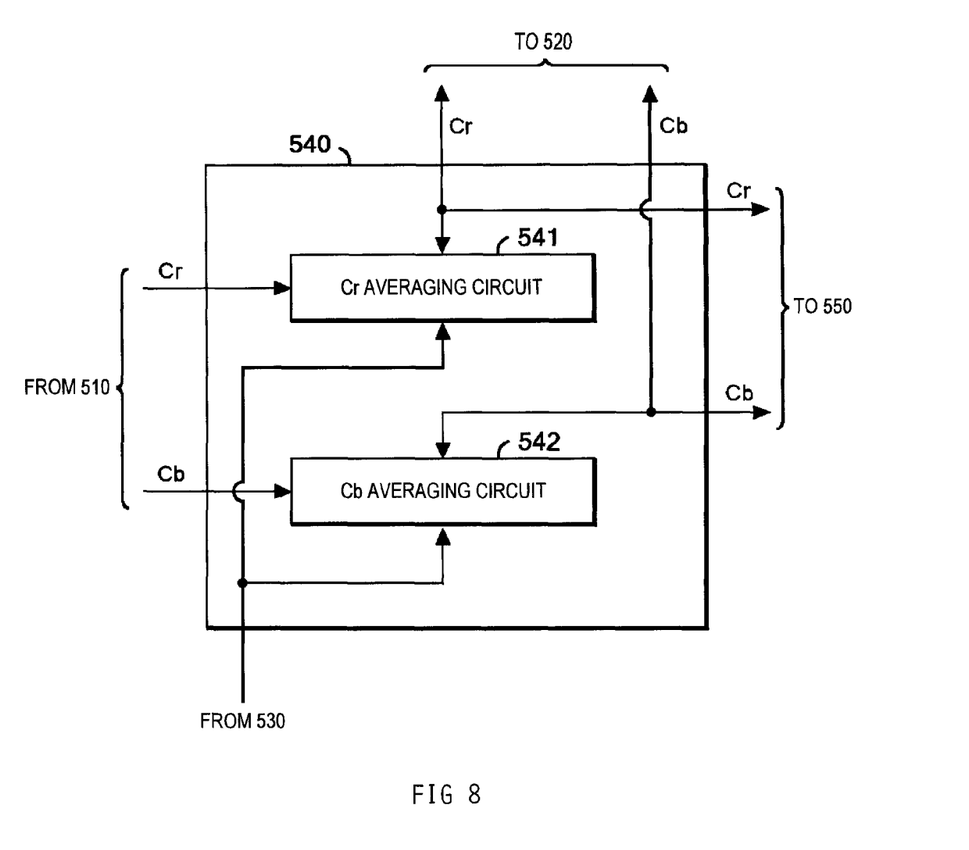
FIG. 8 is a diagram showing an example of the configuration of a Cr and Cb data corrector of the image signal processing apparatus.

FIG. 8 shows an example of the configuration of the Cr and Cb data corrector 540. The Cr and Cb data corrector 540 includes a Cr averaging circuit 541 and a Cb averaging circuit 542 that average the Cr data and the Cb data on the image signals for the pixels in both the first line and the second line of the adjacent line pair, respectively. If the result of the determination that the line to which the pixels from which the component image signals Y, Cr and Cb are captured belong is the second line of the adjacent line pair (the result of determination as to which line of the line pair is relevant) is provided from the frame and line recognizer 530, the Cr averaging circuit 541 acquires the component image signals Cr for the pixels in the second line provided from the circuit (Cr) 512 of the image signal input 510 and the component image signals Cr for the pixels in the first line read from the line pixel memory (Cr) 522 of the buffer 520 and takes the averages of both Cr data. At the same time, similarly, the Cb averaging circuit 542 acquires the component image signals Cb for the pixels in the second line provided from the circuit (Cb) 513 of the image signal input 510 and the component image signals Cb for the pixels in the first line read from the line pixel memory (Cb) 523 of the buffer 520 and takes the averages of both Cb data. The Cr averaging circuit 541 provides the averaged Cr data to the buffer 520 and the image signal output 550, and the Cb averaging circuit 542 provides the averaged Cb data to the buffer 520 and the image signal output 550.

The averaged Cr data and the averaged Cb data provided to the buffer 520 are retained in the buffer 520 as the YCrCb 4:2:2 image signals for the pixels in the second line. The averaged Cr data and the averaged Cb data provided to the image signal output 550 are sent out from the image signal output 550 as the YCrCb 4:2:2 image signals for the pixels in the first line. Although an example of the configuration of the Cr and Cb data corrector 540 that includes the Cr averaging circuit 541 and the Cb averaging circuit 542 has been described, the Cr and Cb data corrector 540 is not limited to the configuration that includes the averaging circuits. The Cr and Cb data corrector 540 can include any circuits that correct the data on the Cr and Cb components of the YCrCb 4:2:2 image signals for the pixels at least in the first line of the first line and the second line of the line pair based on the data on the Cr and Cb components of the YCrCb 4:2:2 image signals for the pixels in the second line.

Figure 9:
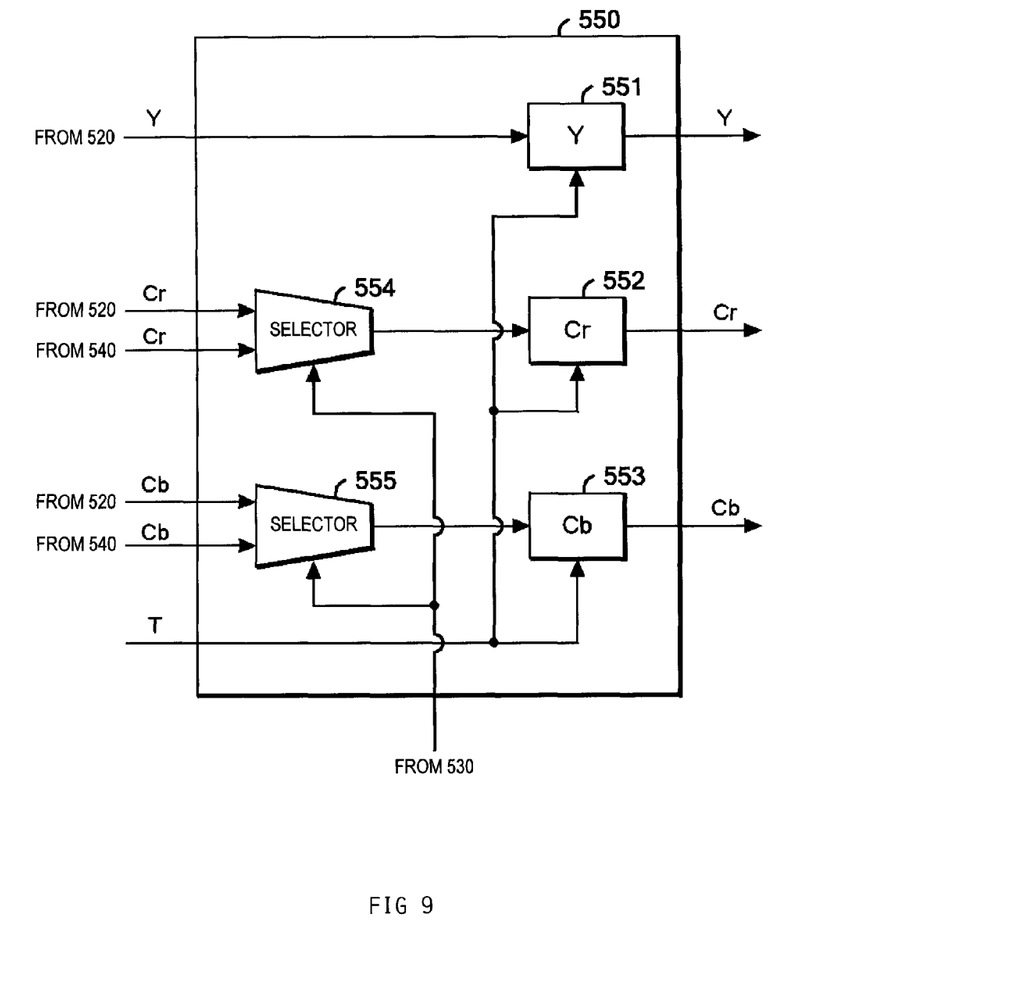
FIG. 9 is a diagram showing an example of the configuration of an image signal output of the image signal processing apparatus.

FIG. 9 shows an example of the configuration of the image signal output 550. As with the image signal input 510 shown in FIG. 6, the image signal output 550 includes latch-like circuits (Y) 551, (Cr) 552 and (Cb) 553 that temporarily store the Y, Cr and Cb components of the YCrCb 4:2:2 image signals for the pixels, respectively. The circuit (Y) 551, the circuit (Cr) 552 and the circuit (Cb) 553 are synchronized with each other by a timing signal T and send out the Y, Cr and Cb components of the YCrCb 4:2:2 image signal for each pixel, respectively. In addition to the circuit (Y) 551, the circuit (Cr) 552 and the circuit (Cb) 553, the image signal output 550 includes selectors 554 and 555. The circuit (Y) 551 receives the component image signal Y for each pixel from the buffer 520, more specifically, the line pixel memory (Y) 521. The circuit (Cr) 552 and the circuit (Cb) 553 receive the component image signals Cr and Cb for each pixel from the selectors 554 and 555, respectively.

The selector 554 receives the component image signal Cr for each pixel from the buffer 520, more specifically, the line pixel memory (Cr) 522 and the component image signal Cr for each pixel from the Cr and Cb data corrector 540, more specifically, the Cr averaging circuit 541. The selector 554 selects the component image signal Cr provided from the Cr and Cb data corrector 540 and provides the component image signal Cr to the circuit (Cr) 552 if the result of the determination (as to which line of the line pair is relevant) provided from the frame and line recognizer 530 is that the pixel to be sent belongs to the first line, and selects the component image signal Cr provided from the buffer 520 and provides the component image signal Cr to the circuit (Cr) 552 if the result of the determination (as to which line of the line pair is relevant) is that the pixel to be sent belongs to the second line.

Similarly, the selector 555 receives the component image signal Cb for each pixel from the buffer 520, more specifically, the line pixel memory (Cb) 523 and the component image signal Cb for each pixel from the Cr and Cb data corrector 540, more specifically, the Cb averaging circuit 542. The selector 555 selects the component image signal Cb provided from the Cr and Cb data corrector 540 and provides the component image signal Cb to the circuit (Cb) 553 if the result of the determination (as to which line of the line pair is relevant) provided from the frame and line recognizer 530 is that the pixel to be sent belongs to the first line, and selects the component image signal Cb provided from the buffer 520 and provides the component image signal Cb to the circuit (Cb) 553 if the result of the determination (as to which line of the line pair is relevant) is that the pixel to be sent belongs to the second line.

Although no example of the configuration of the frame and line recognizer 530 has been shown, the frame and line recognizer 530 can have any common configuration in the art of image processing. For example, counters for frame, line and pixel can be provided. The pixel counter counts the captured pixels, starting with 0, until the last pixel in one line is reached. When the pixel counter counts the last pixel, the line counter is incremented by 1. The line counter counts the lines, starting with 0, until the last line of one frame is reached. If the count of the line counter is 0, the line to which the pixel being captured belongs is identified as the first line. If the count of the line counter is equal to the identification number of the last line, the line to which the pixel being captured belongs is identified as the last line. If the line counter is configured to indicate the first line of the line pair if the count of the line counter is an even number, such as 0, 2, 4 and so on, and indicate the second line of the line pair if the count of the line counter is an odd number, such as 1, 3, 5 and so on, the result of the determination of whether the pixel being captured belongs to the first line or the second line (the result of determination as to which line of the line pair is relevant) can be provided. When the line counter counts the last line of one frame, the frame counter is incremented by 1. The frame counter counts the frames from the first frame to the last frame. Whether the line to which the pixel being captured belongs to the first frame or the last frame is determined by the count of the frame counter.

Although the present invention has been described with regard to implementations thereof, the technical scope of the present invention is not limited to the scope defined by the implementations described above. Various modifications or alterations can be made to the implementations, and such modified or altered implementations are included in the technical scope of the present invention.

The invention claimed is:

1. An image signal processing method that retains a YCrCb 4:2:2 image signal in a buffer and processes the YCrCb 4:2:2 image signal, comprising:
capturing YCrCb 4:2:2 image signals from a line in a frame on a pixel basis;
determining whether the line including the pixels from which the YCrCb 4:2:2 image signals are captured is a first line or a second line of an adjacent line pair;
retaining the YCrCb 4:2:2 image signals for the pixels in the first line in the buffer if it is determined that said line is the first line;
reading YCrCb 4:2:2 image signals for the pixels in the first line at the same horizontal positions as the pixels in the second line from the buffer and correcting Cr and Cb data on the YCrCb 4:2:2 image signals for the pixels at least in the first line of the first and second lines of the line pair based on Cr and Cb data on the captured YCrCb 4:2:2 image signals for the pixels in the second line if it is determined that said line is the second line;
sending the YCrCb 4:2:2 image signals with the corrected Cr and Cb data for the pixels in the first line as the YCrCb 4:2:2 image signals for the pixels in the first line;
retaining the YCrCb 4:2:2 image signals for the pixels in the second line in the buffer;
sending the YCrCb 4:2:2 image signals for the pixels in the second line retained in the buffer as the YCrCb 4:2:2 image signals for the pixels in the second line; and
repeating a process from the step of capturing the YCrCb 4:2:2 image signals from a line on a pixel basis to the step of sending the YCrCb 4:2:2 image signals for the pixels in the second line retained in the buffer until the line from which the YCrCb 4:2:2 image signals are captured reaches a final line in a final frame.

2. The image signal processing method according to claim 1, wherein the step of sending the YCrCb 4:2:2 image signals for the pixels in the second line retained in the buffer as the YCrCb 4:2:2 image signals for the pixels in the second line includes sending the YCrCb 4:2:2 image signals for the pixels in the second line retained in the buffer before the step of retaining the YCrCb 4:2:2 image signals for the pixels in the first line of a next adjacent line pair to be captured in the buffer.

3. The image signal processing method according to claim 2, wherein the step of correcting the Cr and Cb data on the YCrCb 4:2:2 image signals for the pixels at least in the first line of the first and second lines of the line pair includes correcting the Cr and Cb data on the YCrCb 4:2:2 image signals for the pixels in both the first line and the second line of the line pair.

4. The image signal processing method according to claim 3, wherein the correction of the Cr and Cb data on the YCrCb 4:2:2 image signals for the pixels in both the first line and the second line of the line pair includes averaging the Cr and Cb data on the YCrCb 4:2:2 image signals for the pixels in both the first line and the second line.

5. The image signal processing method according to claim 1, wherein the step of correcting the Cr and Cb data on the YCrCb 4:2:2 image signals for the pixels at least in the first line of the first and second lines of the line pair includes correcting the Cr and Cb data on the YCrCb 4:2:2 image signals for the pixels in both the first line and the second line of the line pair.

6. The image signal processing method according to claim 5, wherein the correction of the Cr and Cb data on the YCrCb 4:2:2 image signals for the pixels in both the first line and the second line of the line pair includes averaging the Cr and Cb data on the YCrCb 4:2:2 image signals for the pixels in both the first line and the second line.

7. An image signal processing apparatus for processing a YCrCb 4:2:2 image signal, comprising:

an image signal input for capturing YCrCb 4:2:2 image signals from a line in a frame on a pixel basis;

a buffer for retaining the YCrCb 4:2:2 image signals captured by the image signal input;

a frame and line identifier for determining whether the line from which the YCrCb 4:2:2 image signals are captured is a first line or a second line of an adjacent line pair based on frame and line information on the YCrCb 4:2:2 image signals captured by the image signal input;

a Cr and Cb data corrector for, if the frame and line identifier determines that said line is the second line, reading YCrCb 4:2:2 image signals for the pixels in the first line at the same horizontal positions as the pixels in the second line from the buffer and correcting Cr and Cb data on the YCrCb 4:2:2 image signals for the pixels at least in the first line of the first and second lines of the line pair based on Cr and Cb data on the captured YCrCb 4:2:2 image signals for the pixels in the second line; and an image signal output for sending the YCrCb 4:2:2 image signals for a line in a frame on a pixel basis;

wherein if the frame and line identifier determines that said line is the first line, the captured YCrCb 4:2:2 image signals for the pixels in the first line are retained in the buffer, and if the frame and line identifier determines that said line is the second line, the Cr and Cb data on the YCrCb 4:2:2 image signals for the pixels in the second line from the Cr and Cb data corrector are retained in the buffer, the YCrCb 4:2:2 image signals with the corrected Cr and Cb data for the pixels in the first line are sent as the YCrCb 4:2:2 image signals for the pixels in the first line, and the YCrCb 4:2:2 image signals for the pixels in the second line retained in the buffer are sent as the YCrCb 4:2:2 image signals for the pixels in the second line, and YCrCb 4:2:2 image signals are captured from a line on a pixel basis, the YCrCb 4:2:2 image signals with the corrected Cr and Cb data for the pixels in the first line are sent, and the YCrCb 4:2:2 image signals for the pixels in the second line retained in the buffer are sent until it is recognized from the frame and line information that the line from which the YCrCb 4:2:2 image signals are captured reaches a final line in a final frame.

8. The image signal processing apparatus according to claim 7, wherein the sending of the YCrCb 4:2:2 image signals for the pixels in the second line retained in the buffer occurs before the YCrCb 4:2:2 image signals for the pixels in the first line of a next adjacent line pair to be captured are retained in the buffer.

9. The image signal processing apparatus according to claim 8, wherein the Cr and Cb data corrector corrects the Cr and Cb data on the YCrCb 4:2:2 image signals for the pixels in both the first line and the second line of the line pair.

10. The image signal processing apparatus according to claim 9, wherein the Cr and Cb data corrector averages the Cr and Cb data on the YCrCb 4:2:2 image signals for the pixels in both the first line and the second line.

11. The image signal processing apparatus according to claim 7, wherein the Cr and Cb data corrector corrects the Cr and Cb data on the YCrCb 4:2:2 image signals for the pixels in both the first line and the second line of the line pair.

12. The image signal processing apparatus according to claim 11, wherein the Cr and Cb data corrector averages the Cr and Cb data on the YCrCb 4:2:2 image signals for the pixels in both the first line and the second line.

* * * * *